Figure 1:
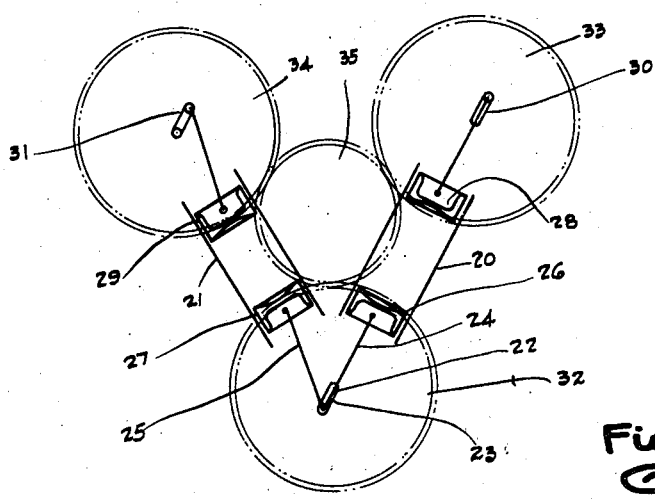

Feb. 5, 1929.    H. T. HERR    1,701,363

DIESEL ENGINE

Filed April 14, 1926    10 Sheets-Sheet 1

WITNESSES:

H.T. Herr
INVENTOR

BY
ATTORNEY

Feb. 5, 1929.

H. T. HERR 1,701,363

DIESEL ENGINE

Filed April 14, 1926     10 Sheets-Sheet 2

H.T.Herr
INVENTOR

WITNESSES:

BY
a. B. Reavis
ATTORNEY

Feb. 5, 1929.

H. T. HERR 1,701,363

DIESEL ENGINE

Filed April 14, 1926     10 Sheets-Sheet 5

H.T. Herr
INVENTOR

WITNESSES:

BY A. B. Reavis
ATTORNEY

Feb. 5, 1929.  H. T. HERR  1,701,363
DIESEL ENGINE
Filed April 14, 1926    10 Sheets-Sheet 6

WITNESSES:

H.T.Herr
INVENTOR

BY
A. B. Reavis
ATTORNEY

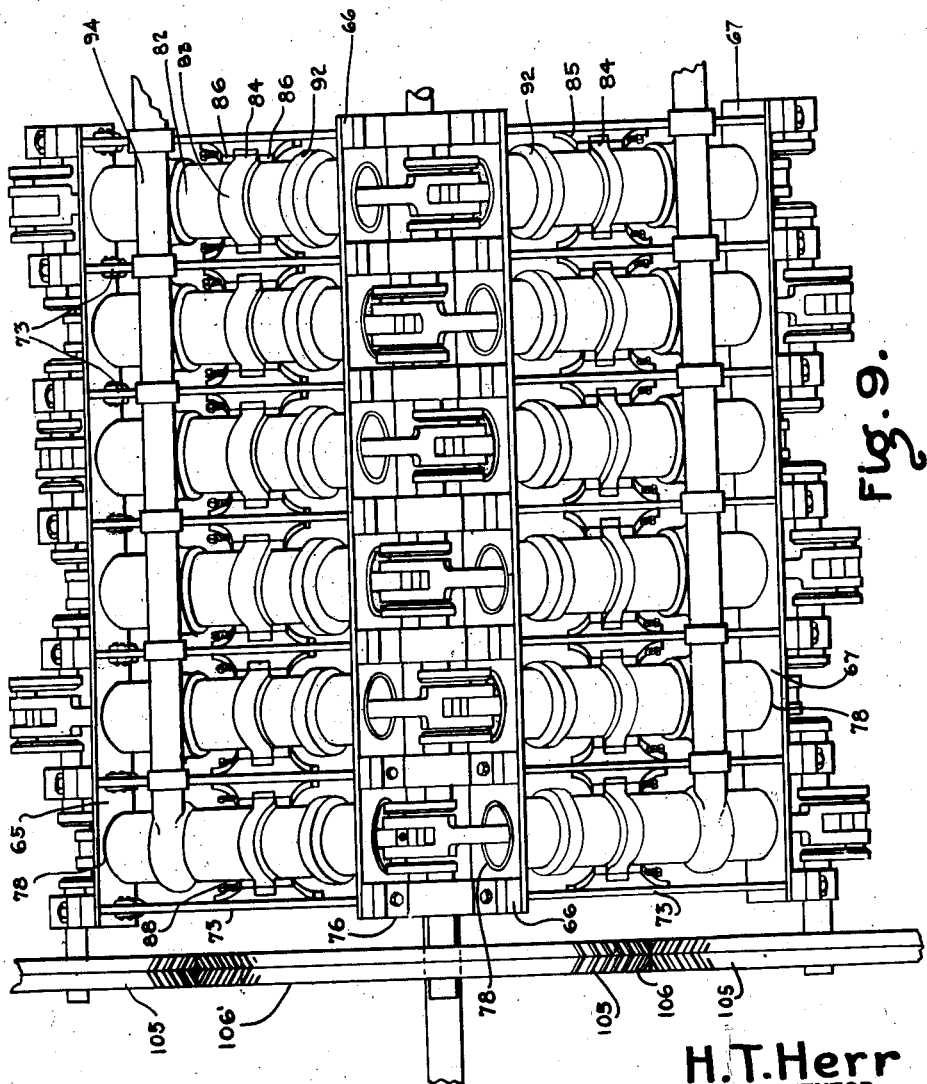

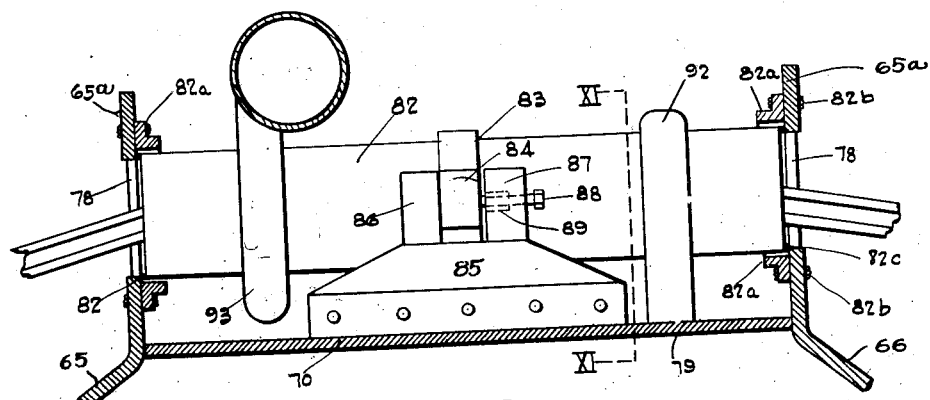
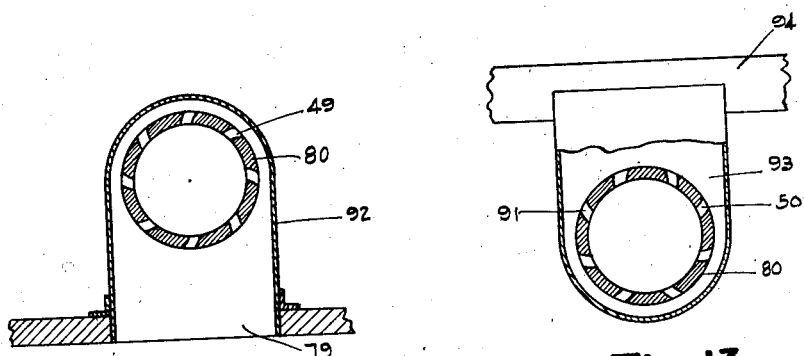
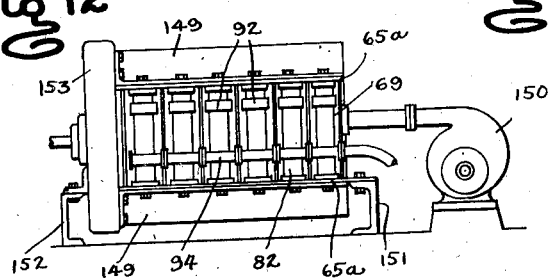

Feb. 5, 1929.  1,701,363
H. T. HERR
DIESEL ENGINE
Filed April 14, 1926  10 Sheets-Sheet 9

WITNESSES:

H.T. Herr
INVENTOR
BY
A. B. Reavis
ATTORNEY

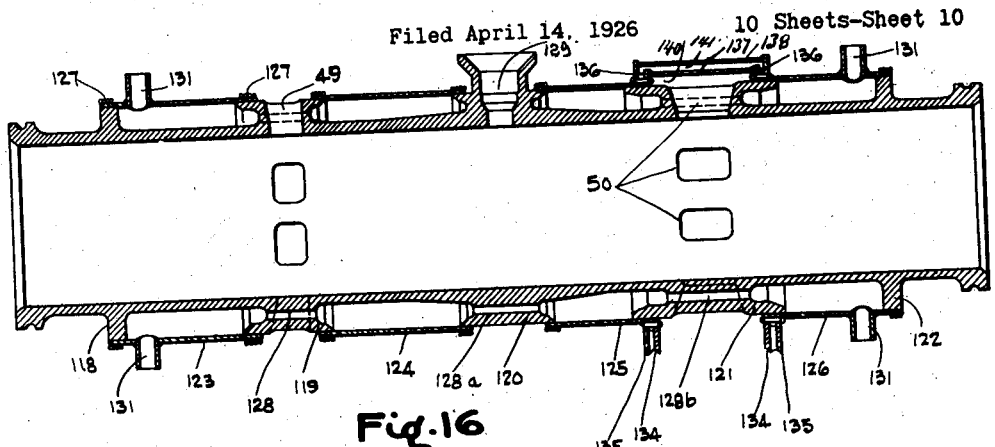
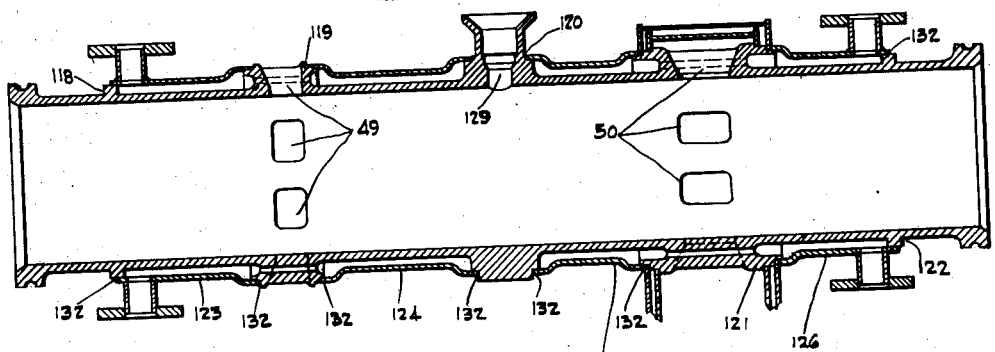
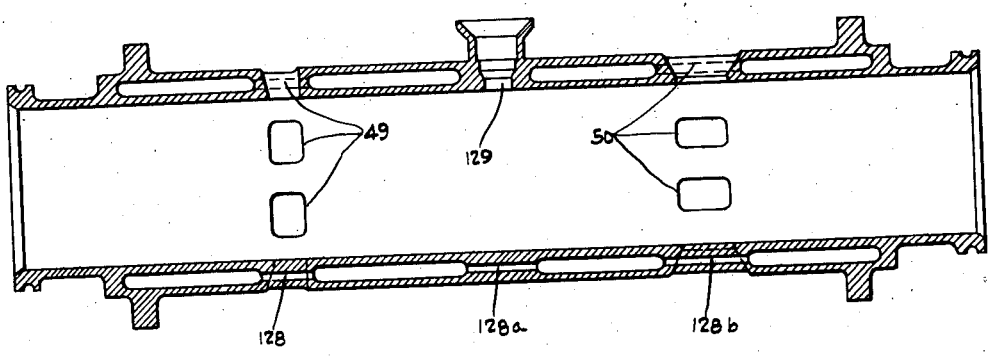

Patented Feb. 5, 1929.

1,701,363

UNITED STATES PATENT OFFICE.

HERBERT T. HERR, OF MERION, PENNSYLVANIA, ASSIGNOR TO WESTINGHOUSE ELECTRIC & MANUFACTURING COMPANY, A CORPORATION OF PENNSYLVANIA.

DIESEL ENGINE.

Application filed April 14, 1926. Serial No. 102,043.

My invention relates to internal combustion engines, particularly of the opposed-piston type, and it has for its object to provide an engine of the character designated which shall embody any desired number of sets of engine units, each set consisting of an even number of engine units having substantially similar cylinders arranged to deliver their power to a common driven element, whereby an engine of extreme lightness and flexibility of capacity may be secured.

More specifically, my invention relates to an engine consisting of a desired number of sets of engine units, each set including an even number of such engine units, each engine unit preferably being of the opposed piston type, and all of the pistons of the engine units being connected to crank shafts, which, in turn, are interconnected so that all the moving parts of the engine are connected together for operation in unison. The invention may be carried out by having sets of engine units arranged in V form, square form, hexagon form, or in any form wherein an even number of cylinders is employed for each set of engine units, the sets being superimposed in order to build up an engine of any desired capacity.

More specifically, my invention relates to the provision of an even number of opposed-piston cylinders arranged to form a closed polygon with crank shafts at the vertices, any desired number of such polygons being superimposed, the one upon the other, to build up an engine of any desired capacity.

A further object of my invention is to provide a polyhedral engine means having a structure associated with the polyhedron for properly supporting the cylinders and the crank shafts which structure may, for example, take the form of a frame telescopically arranged with respect to or extending into the engine means.

A further object of my invention is to provide a polyhedral engine with a supporting frame embodying parallel flange elements for supporting the ends of the cylinders, the flange elements cooperating with other structure of the frame to provide channel spaces transversely of which the cylinders are disposed.

A further object of my invention is to provide a polyhedral engine of the two-cycle type having improved exhaust and scavenging means.

Figure 2:
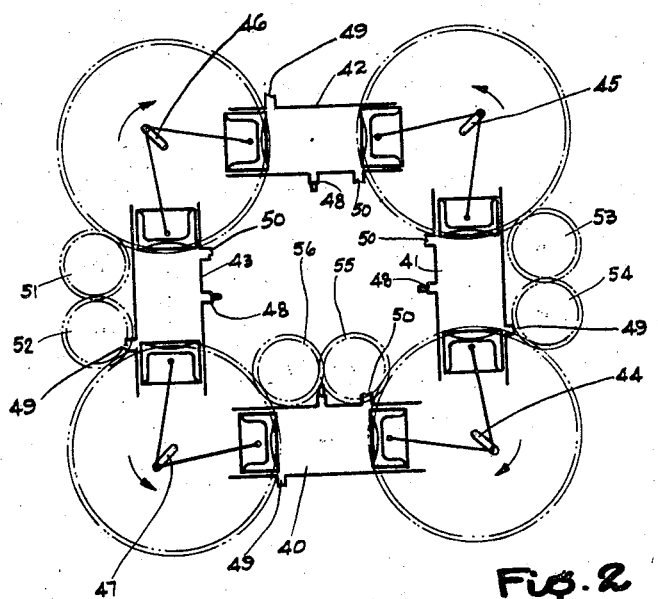
Figure 3:
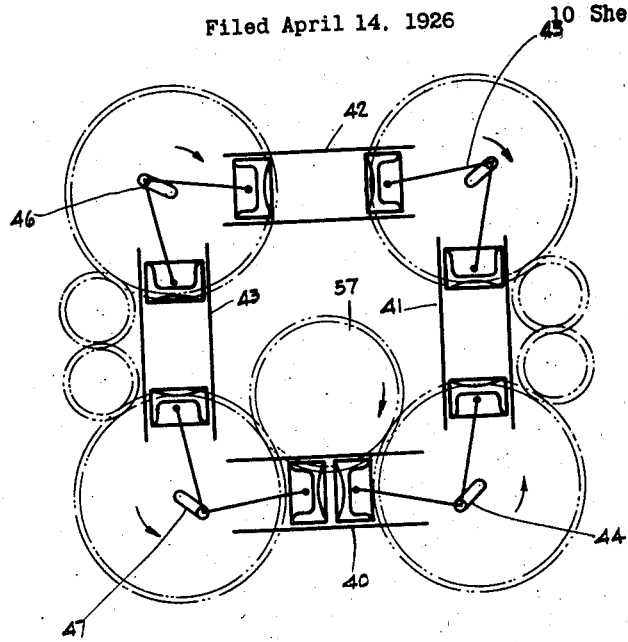
Figure 4:
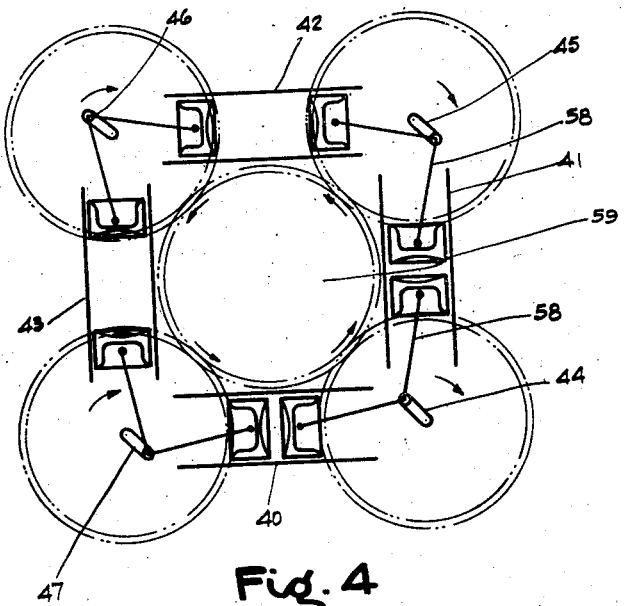
Figure 5:
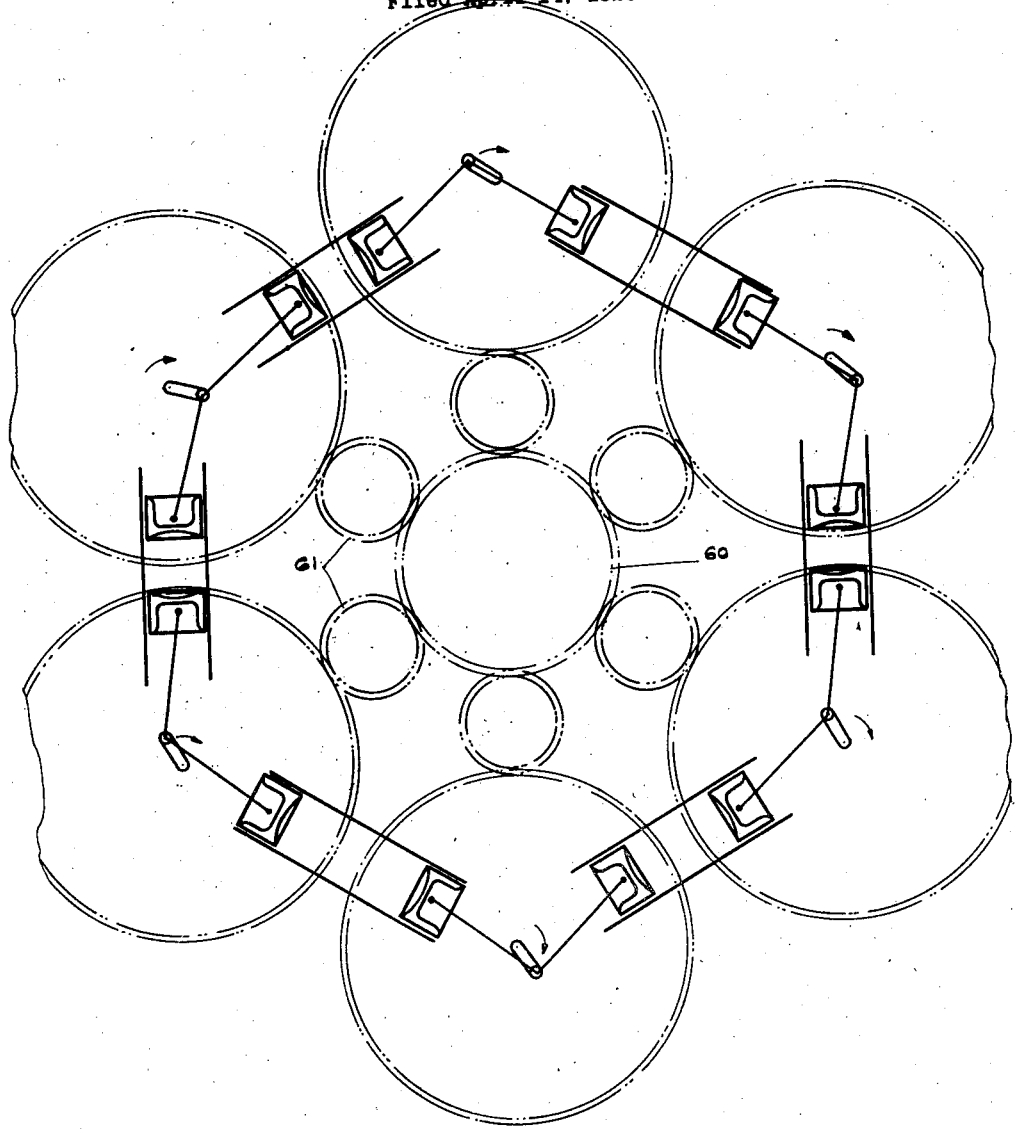
Figure 6:
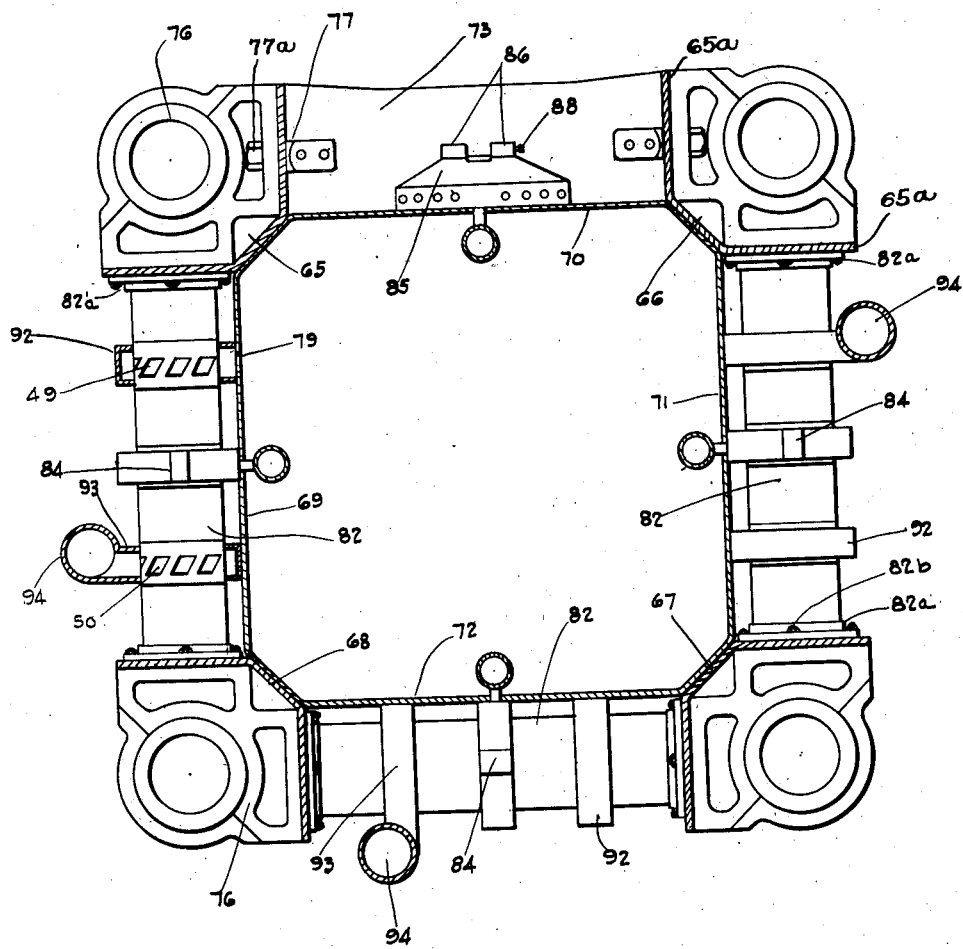
Figure 7:
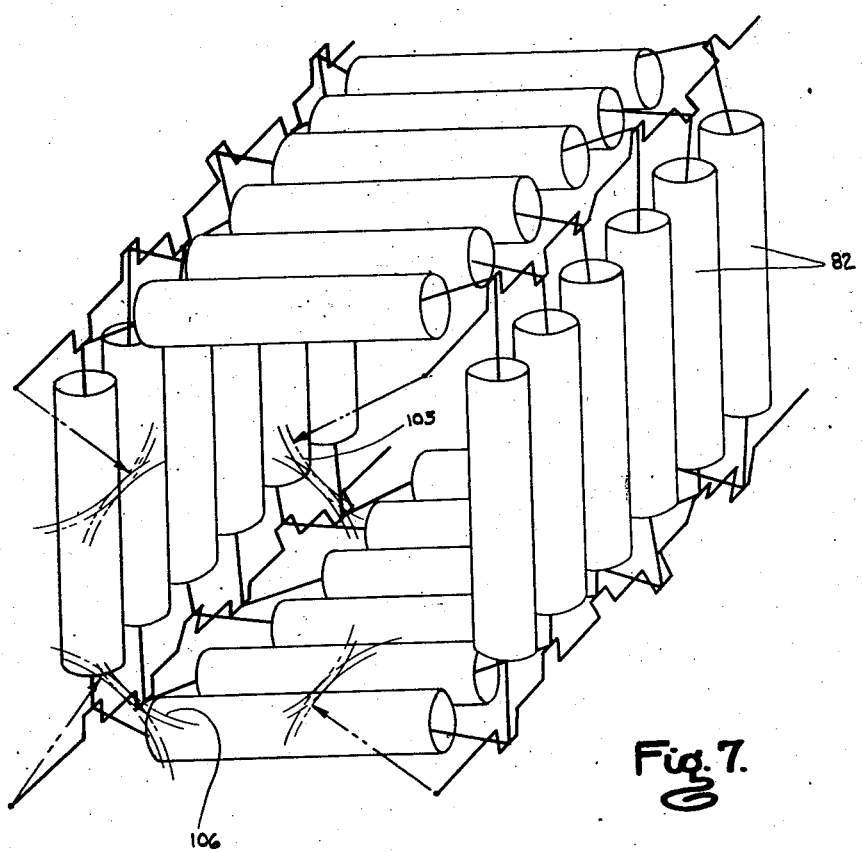
Figure 19:
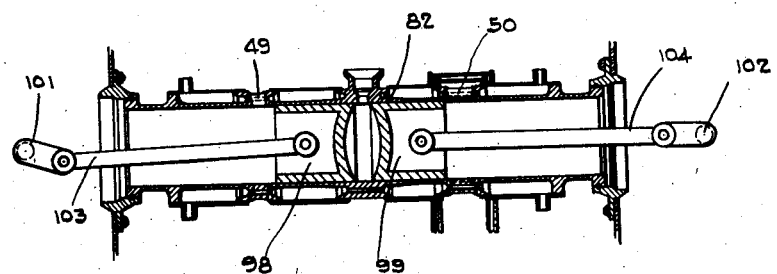
Figures 8, 11:
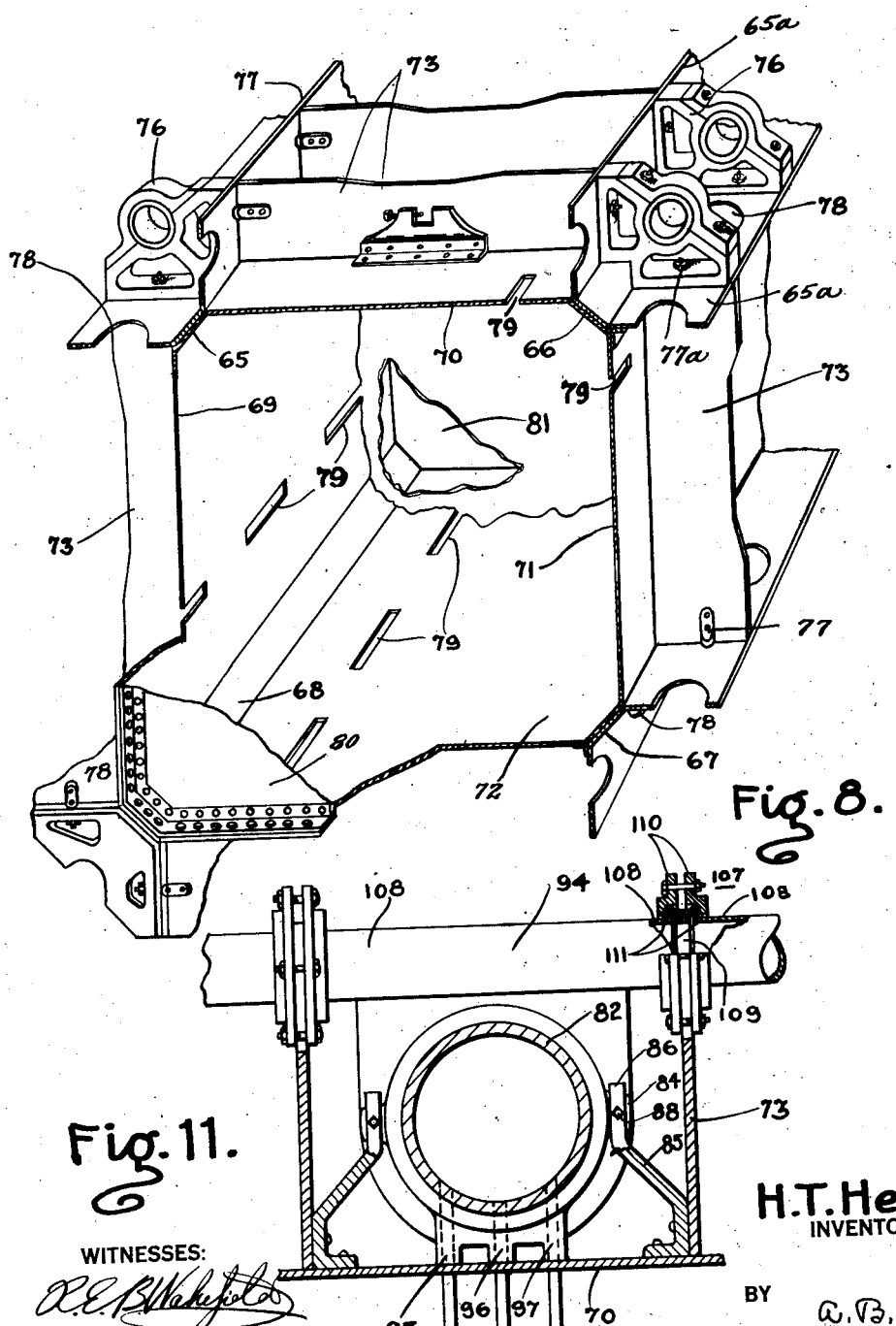
Figure 14:
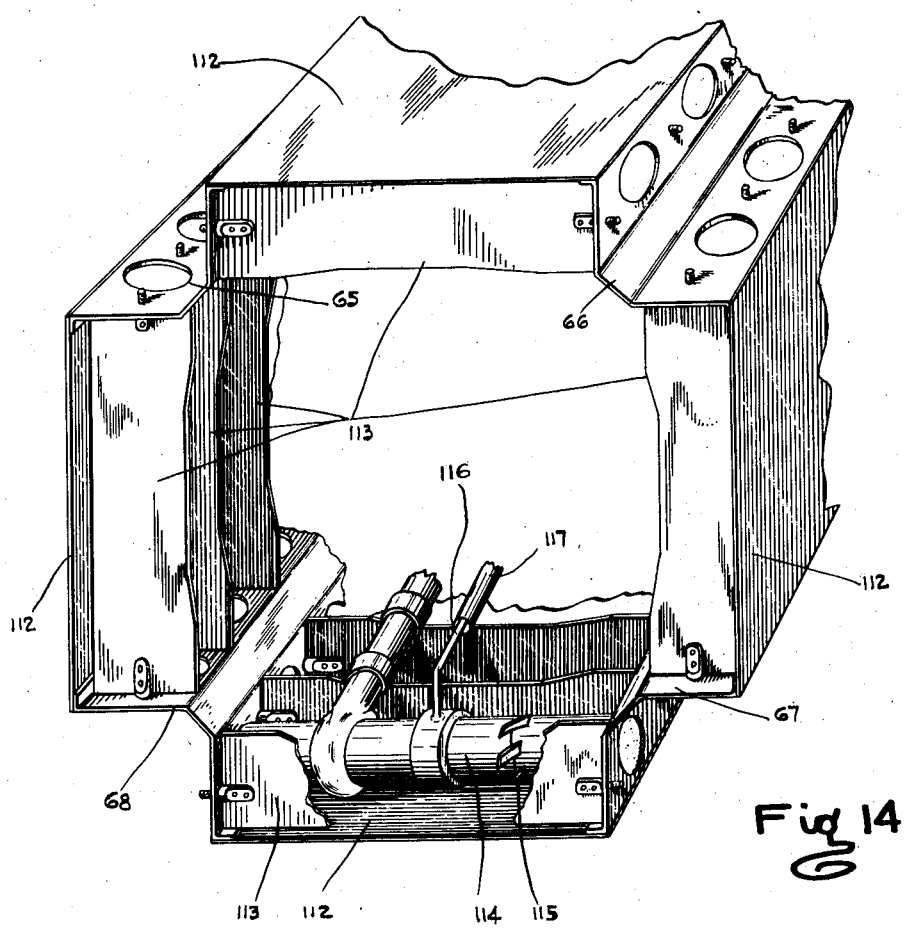
Figure 15:
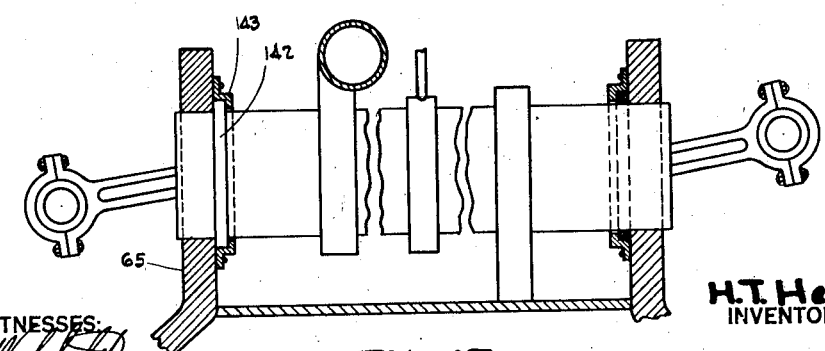

Referring to the drawing for a more detailed understanding of my invention I show in Fig. 1 the simplest assemblage of a plurality of opposed piston cylinders, i. e., two cylinders disposed so that their longitudinal axes intersect and having a common crank shaft passing through said point of intersection; Fig. 2 illustrates diagrammatically a square engine where adjacent crank shafts rotate in opposite directions; Fig. 3 illustrates diagrammatically a square engine wherein two adjacent crank shafts rotate in one direction and the remaining crank shafts rotate in the opposite direction, thus simplifying the gearing; Fig. 4 illustrates the application of my invention to a square engine wherein all crank shafts rotate in the same direction; Fig. 5 illustrates the application of my invention to a hexagonal engine wherein all crank shafts rotate in the same direction; Fig. 6 is an end-view, partially in section and partially in elevation, of a square engine embodying my invention constructed according to Fig. 4; Fig. 7 is a perspective view of the cylinder and gear arrangement of the engine shown in Fig. 6; Fig. 8 is a perspective view of the frame arrangement for the engine shown in Fig. 7; Fig. 9 is a view of the assembled engine shown in Figs. 6, 7 and 8 taken from a corner thereof; Fig. 10 is a detail view of one side of one of the cylinders of the engine shown in the preceding figures and illustrating the method of mounting the individual cylinders; Fig. 10 is a fragmentary sectional view of a further form of cylinder mounting; Fig. 11 is a sectional view of the structure of Fig. 10, taken on the line XI—XI thereof. Figs. 12 and 13 are detail sectional views of the cylinders taken through the inlet and exhaust ports thereof to show the inclination of the ports; Fig. 14 is a view similar to Fig. 8 and illustrating a modified form of frame construction; Fig. 15 is a view similar to Fig. 10 and illustrating a modified form of cylinder mounting; Figs. 16, 17 and 18 are longitudinal sectional views of cylinders; and Fig. 19 is a longitudinal sectional view of an engine unit; Fig. 20 is an assembly view of the apparatus.

It is one of the principal objects of my invention to provide an internal combustion engine, preferably of the Diesel type, which shall have a relatively low ratio of weight to power. This result is achieved by making each of the engine units of the high-speed type, by designing the engine units so that the cylinder diameters shall be fairly small, and by so relating the engine units in a mechanical sense that the engine is made up of a plurality of transverse sets of engine units, each set of such units being comprised by an even number thereof, and all of the units being connected to crank shafts, which are interconnected for operation in unison. Such an arrangement of cylinders and connection of the pistons thereof to the driven mechanism makes it possible to concentrate a large number of engine units within a given space. In view of the fact that the engine units are relatively small, the problem of cooling is greatly simplified, it being unnecessary to cool the pistons and the cooling arrangements for the cylinders being quite effective.

I have found that an exceedingly convenient way of securing this result is by constructing a box frame of polygonal cross section, the individual members whereof are relatively simple, inexpensive and light and I then dispose the cylinders around said frame in a series of closed polygons, any desired number of said polygons being superimposed, the one upon another, to permit the development of the desired power. The box or tubular frame, consisting of corner constructions joined by suitable means, constitutes a girder construction possessing sufficient torsional rigidity to resist deformation. By this means, an engine of the so-called unit type is provided wherein engines of widely varying capacities may be provided by the assemblage of standard cylinder units. In other words, I provide an engine which is made up of a plurality of transverse sets of engine units, each engine unit being of the opposed-piston type and all of the units being connected to interconnected crank shafts so that all the moving parts of the engine operate in unison.

Another feature of my invention is that the opposed piston cylinders are loosely embraced in a gland at each end so as to prevent lateral movement thereof and are firmly held against a longitudinal movement by appropriate means at the centers thereof, whereby the respective cylinders are permitted to expand and contract freely away from the center and the operating characteristics thereof are disturbed to a minimum degree by temperature changes although the effect of expansion upon the port location is so small that the cylinders may be held against end movement at any other point, such as one end thereof.

Referring to the drawing for a more detailed understanding of my invention, I show diagrammatically two cylinders of the opposed piston type at 20 and 21 in Fig. 1, said cylinders being inclined at an angle to each other so that their longitudinal axes intersect at a point 22.

A crank shaft 23 is mounted so that its longitudinal axis passes through said point of intersection and is connected by suitable connecting rods 24 and 25 to the adjacent pistons 26 and 27 of the cylinders 20 and 21.

The remaining pistons, 28 and 29, are connected to crank shafts 30 and 31 and the power from the various crank shafts is transmitted through gears 32, 33 and 34 to a common central gear 35.

While the arrangement of Fig. 1 may possibly be considered as the simplest embodiment of my invention, nevertheless, the material is not employed to the best advantage inasmuch as the crank shafts 30 and 31, respectively, receive power from only one-half of the number of pistons which transmit power to the crank shaft 23. Accordingly, for greater economy of material and symmetry of design it is desirable to carry forward the idea of Fig. 1 and to arrange the opposed-piston cylinders to form a closed polygon as shown in Fig. 2, wherein cylinders 40, 41, 42 and 43 are arranged on the sides of a square with crank shafts 44, 45, 46, and 47 at the corners or vertices thereof. It will be noted that an equal number of pistons impart power to each crank shaft, thus enhancing the symmetry of design and the operating balance, at the same time employing all material to the highest efficiency. Inasmuch as the drawing of Fig. 2 is purely diagrammatic, I have not indicated all the essential operating details but have indicated fuel injection valves at 48—48, inlet ports at 49—49, exhaust ports at 50—50 and suitable gears 51, 52, 53, 54, 55 and 56 for collecting the power generated to a common point, the power being taken for example from one of the gears 55 or 56 or from any number or all of the gears, 51, 52, 53, 54, 55 and 56. An advantage in the use of this gear train is that when using the assembly to drive a generator in a locomotive, the disposition of the gears 55 and 56 below the center of the engine permits the center of gravity of the generator to be disposed relatively low, thus enhancing the stability of the locomotive.

It will be noted that adjacent crank shafts in Fig. 2 rotate in opposite directions, thus securing a maximum of running balance.

Referring to the form of my invention shown in Fig. 3, four cylinders, 40, 41, 42 and 43 are shown as before but the crank shafts are so arranged that the two upper ones, 45 and 46 rotate in one direction whereas the two lower ones, 44 and 47, rotate in the opposite direction. By this means, a single gear 57 may be employed between the gears on the crank shafts 44 and 47, thus permitting the taking off of power at a relatively low or relatively high point in the engine and on the centerline thereof, as contrasted with the arrangement of Fig. 2 wherein the power shaft is slightly off the centerline of the engine. Referring to Fig. 4, I show an arrangement of four cylinders 40, 41, 42 and 43, arranged as already described, but the pistons thereof and the crank shafts are so arranged that the engines operate to move the crank shafts 44, 45, 46 and 47 all in the same direction. With this arrangement it will be noted that whenever the connecting rods 58 of the engine units are angularly disposed with respect to the longitudinal axis of such unit, such rods extend from such axis in opposite directions. In other words, with this arrangement, it is impossible to have the connecting rods of an engine unit extending so as to intersect if prolonged. This modified form is therefore advantageous for the reason that the connecting rods never act to impose added thrusts upon a cylinder, the thrust due to one rod being in an opposite direction to the thrust due to the other rod. Since the crank shafts in this arrangement all rotate in the same direction, it is possible to provide gearing wherein each crank shaft is provided with a gear meshing with a common driven gear 59.

In the arrangement of Fig. 5, there is a still further carrying forward of the same idea, six cylinders being disposed to define a symmetrical hexagon with crank shafts at the respective corners thereof, each crank shaft carrying a gear and these gears meshing with a center gear, 60, through suitable idlers 61—61. As indicated, all the crank shafts of Fig. 5 rotate in the same direction so as to permit of this gearing arrangement.

The same idea of polygonal arrangement of cylinders may be carried forward indefinitely so long as an even number of cylinders are employed so that the pistons in every cylinder may have substantially equivalent angular displacements. If it be attempted to employ a polygon having an odd number of sides, it will be found in general that, starting with a given cylinder and with a given angular displacement of one piston thereof and progressing throughout all the cylinders until the other end of the starting cylinder is reached, the angular displacement of the piston of said cylinder end will be radically different from that of the piston initially considered, an odd number of cylinders may be employed if staggered and the crank shafts are modified. If the cylinders of each set are coplanar, it is necessary that an even number be employed.

Referring now to the actual construction shown in Figs. 6, 8 and 9, four trough shaped members, 65, 66, 67 and 68 are disposed at the corners of a square and are of a length determined by the number of polygon aggregates to be placed in side by side relation for the given engine, in the present case six polygon aggregates employing four cylinders each being combined for a total of twenty-four cylinders.

The trough shaped members, 65, 66, 67 and 68 are joined by longitudinal plate members, 69, 70, 71 and 72, the length of these members also being determined by the number of cylinder sets to be employed in the given engine. The trough members or corner constructions 65, 66, 67, 68 are, therefore, joined by suitable members, for example, 69, 70, 71 and 72 to provide a torsionally rigid frame and one which resists deformation. It will be apparent to those skilled in the art that the trough members or corner constructions might be connected in any suitable manner in order to provide for the requisite torsional rigidity.

Joining the upwardly extending flanges of the trough shaped members, 65 and 66, are a series of spaced transverse plates 73, (Figs. 6 and 7) the spacing of these plates being sufficient to permit the mounting of a cylinder between each pair of adjacent plates. Suitable journal bearings 76, are disposed within the trough shaped members, 65 and 66, opposite the ends of the plates 73, and are bolted in place by members 77 which are split at one end to embrace the respective ends of the plates 73 and which are threaded at the other end, the threaded ends projecting through the flanges of the trough members and also through portions of the journal bearings 76 so as to firmly attach the entire structure together.

It will be understood that plate members 73 are provided on all four sides of the frame and arranged for the disposition of cylinders therebetween. The members 77 attached to the ends of the plates 73 pass through the flanges or members 65ª and through adjacent portions of the bearings 76. As shown in Fig. 8, nuts 77ª are fitted to the threaded ends of the member 77, the nuts cooperating with suitable abutment surfaces provided by the bearings 76. With this structure, it will be apparent that the nuts 77ª may be tightened sufficiently to hold the structure firmly together, the members 73 not only serving as stiffening members for the box construction but also serving to resist engine working forces. When a power stroke takes place in a cylinder, it will be apparent that the crank shaft bearings located adjacent to the cylinder ends will have engine working forces applied thereto tending to spread them apart. These forces are resisted very largely by the plates 73 acting in tension, the nuts 77ᵃ having been suitably adjusted to secure this effect to the best advantage.

It will be noted that the flanges or longitudinal members 65ᵃ cooperate with the longitudinal plates 69, 70, 71 and 72 to provide channel spaces transversely of which are disposed the engine cylinders.

The respective flanges of the trough shaped members are provided with openings 78 therethrough for the cylinder ends, as will be hereinafter explained more in detail. The plate members 69, 70, 71 and 72 are provided with ports 79 (Fig. 8) for the admission of scavenging air to the cylinders as will be explained later. The ends of the frame are closed as by plates 80 and 81 (Fig. 8) so that the entire frame may act as a duct for scavenging air supplied by a suitable blower.

Referring now more particularly to Figs. 6, 9 and 10, it will be noted that each cylinder 82 is received at its ends within a flanged ring 82ᵃ carried by the flange portion of the adjacent trough members 65 and 66 in alignment with the openings 78 in said trough members, the flanged rings 82ᵃ being secured to the flanges by any suitable means, as bolts 82ᵇ. The cylinder length is somewhat less than the distance between the members 65 and 66 so as to permit the insertion of asbestos or other suitable packing material as at 82ᶜ. The cylinder is provided with a circumferential flange 83 midway of its length and on each side of the cylinder there is disposed upon its flange 83 a radially projecting lug 84 as is clearly shown in Fig. 10. A clamping device is formed by suitably shaped plates 85—85, which conform to the angle between a frame plate 69, 70, 71 or 72 and the plate members 73 and then project inwardly and upwardly, to provide two upstanding arms 86 which embrace the lug 84, a clearance preferably being left of, for example, $\frac{1}{32}$ in. As may be seen from Fig. 10, a relatively long, slender screw 88 passes through one of the arms 86 and it is unsupported for a portion of its length adjacent to a lug 84, as indicated by the large counterbore at 89, said screw being set up against the lug 84. This particular structure forms no part of this invention but is separately disclosed and claimed in application, Serial No. 179,766, filed March 31, 1927 by A. T. Kasley and assigned to the Westinghouse Electric and Manufacturing Company (Case 6546).

Thus it will be noted that each cylinder 82, while restrained against longitudinal movement by engagement at its central point, is free to expand and to contract lengthwise with respect to the point of support. The cylinder is restrained from lateral movement, however, by the rings 82ᵃ and the packing 82ᶜ.

Each cylinder 82 is provided with the usual inlet and outlet ports as shown at 49 and 50, respectively, in Fig. 6; and the inlet or scavenging air ports are surrounded by a suitable housing 92 which communicates with an opening 79 in the adjacent plate member so as to give free communication with the large central space defined by the engine frame where suitable scavenging pressure is maintained by a suitable blower, from whence said air has free access to the respective cylinders through the ports 79 when the ports 49 are uncovered by the piston. The housing members 92 cooperate with the scavenge air inlet openings 49 to provide scavenge air inlet chambers, such inlet chambers communicating by way of openings 79 with the supply chamber provided by the longitudinal plates 69, 70, 71 and 72, and end plates 80 and 81. This arrangement is advantageous for the reason that the inlet chambers provided by the members 92 assure that contamination of the scavenge air shall be minimized. Although the exhaust piston uncovers the exhaust ports 50 before the inlet ports 49 are uncovered, nevertheless the pressure within the cylinder does not drop below the pressure of the scavenging air before the scavenge air inlet ports 49 are uncovered, with the result that some of the products of combustion may flow back into the inlet chambers; however, as each cylinder is provided with a separate inlet chamber, contamination is very largely restricted so that the air in the main supply chamber remains relatively pure.

In like manner, suitable housings 93 are provided over the exhaust ports and communicate with suitable exhaust trunks 94.

Each cylinder 82 is preferably provided with three lateral protuberances 95, 96 and 97 which abut against the frame plate member 70 as shown in Fig. 11 and which may be joined in any desired manner to lines for the admission of fuel, injection air, if desired, and starting air. Inasmuch as the particular type of fuel injection apparatus employed forms no part of the present invention, I have deemed it unnecessary to encumber the drawings with the details thereof.

Were the pistons in each cylinder exactly 180° apart in phase, it is obvious that in the construction of Fig. 6 it would make little or no difference which end of each cylinder happened to be inlet and which end happened to be exhaust but it is, in general, desirable to have the exhaust piston lead the inlet piston or scavenging air piston by approximately 15° so as to permit the reduction of the pressure within the cylinder to approximately atmospheric pressure before the admission of the scavenging air and to permit of the exhaust ports being made longer than the inlet ports.

In Fig. 19 I show a cylinder 82 having opposed pistons 98 and 99 therein, the piston 98 being arranged to cover and uncover the inlet, scavenge air ports 49 and the piston 99 being arranged to cover and uncover the exhaust ports 50. The pistons 98 and 99 are connected to crank portions 101 and 102 of crank shafts by connecting rods 103 and 104, respectively; and it will be noted that the crank of crank shaft 102 leads the crank portion of crank shaft 101 by an angle $\alpha$, preferably about 15°, for the purposes just stated.

It will be understood that the cylinder arrangement or set of engine units of Fig. 6 may be multiplied as many times as may be desired. In Figs. 7 and 9, I show an engine consisting of six such engine sets.

In Fig. 7, the power is supplied from the crank shafts to gears 105 which mesh with a driven gear or mechanism 106.

Obviously, if desired, the exhaust trunk might be made as a single pipe except for expansion difficulties. Accordingly, as may be seen from Fig. 11, I prefer to mount a particular section of exhaust trunk unitary with each cylinder 82 and to join these together by suitable joints as indicated at 107, thus, not only providing for expansion, but also making a complete cylinder and exhaust trunk unit, any number of which may be assembled in a given engine aggregate. More particularly, referring to Fig. 11, the exhaust collector member 94 terminates in conduit end portions 108; and adjacent conduit end portions 108 have disposed therebetween a ring member 109. Clamping rings 110 serve to clamp packing 111 in place with respect to the conduit end portions 108 and the ring 109. It will, therefore, be seen that this mode of connection assures a gas tight exhaust conduit while, at the same time, permitting of the unitary construction referred to.

Referring to Figures 12 and 13, Fig. 12 is a cross section of the cylinder through the inlet ports and the member 92 defining an air inlet chamber for the ports and it will be noted that the ports 49 are disposed more or less tangentially so as to give a whirling motion to the scavenging air, thus thoroughly cleansing the cylinder. In like manner, in Fig. 13, the ports 50 are inclined in opposite directions on opposite sides of the cylinder so as to give a free outward sweep of the exhaust gases throughout the exhaust hood 93 to the exhaust pipe 94.

In the engine indicated in Figs. 8 and 9, the longitudinal plate or wall members 69, 70, 71 and 72 are indicated as within the cylinders on the plate members 73, thus exposing the cylinders on the exterior of the engine where they are accessible; however, I may, if desired, employ four trough members 65, 66, 67 and 68 as before but provide longitudinal cover plates 112 over the outer edges of the flanges thereof (Fig. 14) and I may then dispose tension members 113 within these cover plates and joining the flanges of neighboring trough members so as to provide appropriate mounting spaces for the cylinders entirely within the engine frame, one cylinder being shown at 114. Inasmuch as by the use of suitable end cover plates the entire interior of the engine may be maintained under air pressure, it will be obvious that with this arrangement no hood is necessary for the inlet or scavenging air ports but that they may all be exposed directly to the interior of the engine, as indicated at 115.

The fuel lines are indicated at 116; and, as it is obvious that serious damage would be brought about should a fuel line break, and fuel and air pass through the inlet ports, I may provide an annular tube 117 around the fuel supply lines 115 so that all leakage may be caught therewithin and conducted away. In Fig. 14, the surrounding tube 117 is broken away from the cylinder 114 for a distance in order to show the fuel line 115 more clearly.

In Figs. 16, 17 and 18, I show types of cylinders which may be used advantageously with my improved engine. In Fig. 16, which is my preferred form of cylinder, I show a cylinder having radial enlargements 118, 119, 120, 121 and 122, these radial enlargements preferably having coaxial cylindrical surfaces to receive jacket members 123, 124, 125, and 126. The jacket members are preferably made of some suitable soft metallic material, such as copper, in order that the ends of such members may be joined to the radial enlargements in a fluid-tight manner, the end portions of the jacket members being preferably wire wound or wrapped as indicated at 127 in order that the material of the jacket members at the ends thereof and surrounding the radial enlargements may be distorted to fit closely the cylindrical surfaces of the radial enlargements in a fluid-tight manner.

In Fig. 16, a radial enlargement 119 is made sufficiently wide in order that inlet ports 49 for scavenging air may extend therethrough, passages 128 being arranged in the material of the cylinder between the ports 49. The radial enlargement 120 is provided with an an opening 129 to receive any suitable fuel injection means and this enlargement is also provided with longitudinally extending passages 128$^a$. In like manner, the enlargement 121 is provided with exhaust ports 50, and the material of the cylinder between such exhaust ports is provided with longitudinally extending passages 128$^b$. The jacket members 123 and 126 are provided with connections 131 for the ingress and egress of cooling fluid, such cooling fluid passing through the spaces between the jacket members and the cylinder wall and through the passages 128, 128$^a$ and 128$^b$ so as to effectively cool the cylinder throughout its length.

In Fig. 17, I show a cylinder which is similar to that shown in Fig. 16 except that, instead of the tension wire connections 127, depended upon in Fig. 16 for securing fluid-tight joints between the jacket members and the radial extensions of the cylinder, in the present modifications such jacket members are welded to the projection as indicated at 132.

In Fig. 18, I show a further modified form of my invention wherein integral jacket members are used instead of those of the separate type as shown in Figs. 16 and 17.

The form of jacket construction shown in Figs. 16 and 17 is highly advantageous from a manufacturing point of view for the reason that the radial projections 118, 119, 120, 121 and 122 may have cylindrical engaging surfaces of uniform diameter so that the jacket members may be readily placed around the cylinder merely by slipping them endwise thereof. In view of the fact that the jacket members may be slipped over the cylinder from either end, it is only necessary to provide the central radial projection 120 with lateral bearing surfaces for the adjacent ends of the jacket members 124 and 125, it being possible to modify the material of the projection 120 between the adjacent ends of the jacket members in any suitable manner to receive suitable fuel injection apparatus.

With the form of my invention shown in Figs. 16 and 17, it is also possible to simplify the construction and assembly of the exhaust collection apparatus. To this end, I show inner plates 134 and outer plates 135 having openings fitted about the circumferential surfaces of the radial enlargement 121, the pairs of inner and outer plates being spaced apart by suitable ring or packing members 136. Curved inner and outer plates 137 and 138 are respectively welded to and between the inner plates 134 and the outer plates 135, the plates 134 and 137 forming an exhaust chamber 140, whereas the plates 135 and 138 cooperate to form a cooling space 141 about the exhaust chamber.

An exhaust collection chamber of the type referred to is of a unitary character and may be readily assembled about the radial enlargement of the cylinder having the exhaust openings, such collection chamber being placed in position just after the jacket member 125 is positioned; and, after the exhaust collection apparatus is in position, the jacket member 126 is secured in place.

Upon reference to Figs. 16 and 17 it will be noted that each of the radial enlargements has overhanging portions to the exterior of which are joined end portions of the jacket members, such overhanging portions being thoroughly bathed by cooling water so that the material of the cylinder forming a part of the joints with respect to the jacket members are effectively cooled.

While I prefer to have the cylinders 82 anchored against longitudinal movements at their midpoints, as indicated in Figs. 6, 9, and 10, it will be apparent that any portion of the cylinder may be anchored to the supporting structure for this purpose. For example, in Fig. 15, I show a cylinder 82 having an annular shoulder 142, a flange of a corner member 65 and a ring 143 secured to the corner member.

Referring to the first embodiment of my invention, for example, that shown in Figs. 1 to 9 inclusive, in Fig. 20, I show an assembly view, wherein cylinders 82 are disposed transversely of the outside faces of the longitudinal plate members 69, 70, 71 and 72, the plate member 69 appearing in the view. The ends of the cylinders are carried by corner plates 65ª. Tension plates 73 are so disposed as to form pockets or spaces for the cylinders. The crank shafts and the bearings therefore are enclosed by suitable crank cases 149 arranged at the longitudinal corners of the structure. The air chamber formed by the longitudinal plates 69, 70, 71 and 72, and by the end plates 80 and 81, Fig. 8, is supplied by a suitable blower 150. The engine is supported in any suitable manner, as, for example, by feet 151 and 152. A casing 153 is provided for the gearing which connects the crank shafts to the driven shaft.

From the foregoing, it will be apparent that I have provided a polyhedral engine with means cooperating with the crank shafts to resist any tendency of the latter to move apart in operation. Furthermore, it will be seen that I have provided a polyhedral engine including suitable supporting or retaining means having sufficient torsional resistance to oppose deformation incident to the development and transmission of power. It will also be seen that I have provided a polyhedral engine embodying cylinders and crank shafts together with a supporting frame telescopically arranged with respect thereto. Furthermore, my polyhedral engine is provided with an improved scavenging and supercharging system whereby the scavenging and supercharging air may be contained in the reservoir disposed within the polyhedron defined by the engine cylinders, which reservoir may be constituted as heretofore referred to.

While I prefer, as a matter of economy, to scavenge with air it will be apparent that the engine may be scavenged by fuel mixture.

The term "engine working forces", as used herein, to be taken to mean any forces developed in operation and which tend to distort or deform the engine. As already pointed out, the most important of such forces are tension forces tending to move the crank shafts apart and developed during each working stroke and torsion or twisting forces developed incident to the load.

Hence, it will be seen that the arrangement of engine units in groups or sets, as described, permits of the construction of an engine having a large number of engine units arranged in a relatively small space. Since the engine units are all small, problems of cooling and expansion and contraction are readily taken care of. The framework is strong and light. The engine, therefore, not only requires relatively limited space but it is very light for the power developed.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:—

1. In an engine, the combination of a framework consisting of longitudinal members providing channel spaces and transversely extending members extending transversely of the channel spaces, cylinders disposed in the channel spaces, crank shaft bearing members carried by longitudinally extending members and connected together by said transversely-extending members, crank shafts fitting the bearing members, pistons in the cylinders and rods for connecting the pistons to the crank shaft.

2. In an internal combustion engine, a cylinder of the opposed-piston type having open ends, means embracing the ends of said cylinder for restraining the same against lateral movement while permitting free longitudinal movement thereof, and means engaging said cylinder adjacent the midportion of its length for preventing longitudinal movement thereof, whereby the cylinder is free to expand and contract in each direction from the center.

3. In an internal combustion engine, the combination of a frame having opposed pairs of openings, a power-developing cylinder of the opposed-piston type, each end of which is opposite an opening in the engine frame, means carried by the engine frame at the openings and closely embracing the cylinder ends whereby the cylinder ends are firmly restrained against lateral movement while permitting longitudinal movement thereof, and means restraining the cylinders from longitudinal movement engaging the same near the midportion thereof.

4. In an internal combustion engine, the combination of a base member, two plate members upstanding therefrom to define a cylinder pocket, a power developing cylinder of the opposed-piston type disposed within said pocket, said cylinder being provided with radially extending lugs adjacent the middle portion of the length thereof, bracket members springing from the bottom of said cylinder holding pocket and embracing said lugs to restrain the cylinder from longitudinal movement.

5. In an internal combustion engine, a plurality of plate frame members arranged to define a prism, suitable end cover plates for said prism, cylinders disposed adjacent the surface of said prism, means for supplying scavenging air under pressure to the interior of said prism, and means for supplying air from the interior of the prism to the cylinders.

6. In an engine, the combination of a plurality of corner members having outwardly extending flanges; plates for connecting the corner members and extending parallel thereto; strut plates connecting adjacent flanges and extending transversely of the corner members, and disposed substantially normally with respect to the adjacent plate member; cylinders arranged in the spaces between strut plates; means provided on the strut plates and on the cylinders for resisting axial movements of the latter; means carried by the flanges for resisting lateral movements of the cylinders; a crank shaft carried by each of the corner members; opposed pistons in the cylinders, means for connecting the pistons to the crank shafts; and means for connecting the crank shafts together for operation in unison.

7. In an internal combustion engine of the compression ignition type, the combination of a supporting member formed to provide a chamber for air under pressure, cylinders carried by said member and having scavenging air inlet, fuel inlet and exhaust openings, opposed pistons in the cylinders arranged to cover and to uncover said scavenging air inlet and exhaust openings, means for supplying air to said cylinder inlet openings from said chamber, a plurality of crank shafts carried by said member and connected to the pistons, and power transmission means interconnecting the crank shafts.

8. In an internal combustion engine, the combination of a frame having walls defining a chamber for air under pressure and having pairs of parallel wall elements, sets of cylinders carried by the frame, each cylinder having both ends supported by a pair of said wall elements, opposed pistons in the cylinders, crank shafts connected to the pistons, bearings for the crank shafts carried by the frame, and means for supplying scavenging air from said chamber to the cylinders.

9. The combination, with engine means including cylinders and intervening crank shafts disposed in polygonal formation, of sets of coplanar bearings for the crank shafts and members formed independently of the cylinders and cooperating directly with the bearings of each set to connect the bearings in closed series, whereby axial working forces of the engine means applied to the bearings are resisted by the tension members.

10. In power plant apparatus, the combination of a supporting frame, polyhedral engine means disposed about the frame and including cylinders and crank shafts carried thereby, the cylinders each having opposed pistons therein connected to the crank shafts, and means cooperating with the frame and the crank shafts and formed independently of the cylinders and frame for relieving the cylinders of axial working forces.

11. In an internal combustion engine, the combination of a polyhedral frame having bearings at the corners thereof, cylinders supported by the frame, opposed pistons in the cylinders, crank shafts connected to the pistons and supported by said bearings, and tension means directly connecting the bearings to resist axial engine working forces applied to the bearings.

12. In an internal combustion engine, the combination of a polyhedral frame, flange elements and bearings arranged at the corners thereof, cylinders having their ends supported by said flange elements, opposed pistons in the cylinders, crank shafts connected to the pistons and carried by said bearings, and tension means cooperating with said bearings to relieve the cylinders of axial working forces.

13. The combination, with two-cycle internal combustion engine means of the compression ignition type including a plurality of cylinders and intervening crank shafts, a supporting frame for the cylinders, said frame having means defining a scavenge air supply chamber, a hood disposed about each cylinder for supplying scavenging air to the latter, and means for supplying scavenging air from said chamber to the hoods.

14. In an internal combustion engine, the combination of a plurality of straight cylinders arranged in coplanar sets with an even number of cylinders in each set and the axes of the cylinders of each set intersecting, opposed and alined pistons in each of the cylinders, crank shafts disposed adjacent to the cylinder ends, connected to the pistons, and having their axes located at the respective intersections of said cylinder axes, gearing mechanism for interconnecting the crank shafts for operation in unison, and a frame for supporting the cylinders and arranged to permit freedom of expansive movement of the cylinders relative to said frame.

15. In power plant apparatus, the combination of a box construction having side walls and engine means disposed about the construction and including cylinders and crank shafts carried thereby, said cylinders extending transversely of the side walls and being so supported by the latter as to permit expansive movements independent of the box construction and the crank shafts being disposed at corner regions of the construction.

16. In power plant apparatus, the combination of a torsionally rigid polyhedral frame having side walls and engine means disposed about the construction and including cylinders and crank shafts carried thereby, said cylinders extending transversely of and adjacent to the side walls and the crank shafts being disposed at corner regions of the frame.

17. In power plant apparatus, the combination of engine means including a closed series of alternately arranged cylinders and crank shafts disposed in polygonal formation with opposed and alined pistons in the respective cylinders and connected to the crank shafts, bearings for the crank shafts, and a frame formed independently of the cylinders and of the bearings for supporting the cylinders, bearings, and the crank shafts and provided with means cooperating directly with the bearings for resisting engine working forces.

18. The combination, with engine means including straight cylinders so arranged that their axes intersect to define a polyhedron and crank shafts having their axes located at the respective points of intersection, of a frame formed independently of the cylinders for supporting the latter and bearings arranged exteriorly of and carried by the frame for supporting the crank shafts.

19. In power plant apparatus, the combination of a supporting frame having walls defining a chamber for air under pressure, engine means of the compression ignition type disposed about said chamber and including cylinders and crank shafts carried by the frame, means for supplying scavenging air from said chamber to the cylinders, and means independent of the scavenging means for supplying fuel to the cylinders.

20. In an internal combustion engine of the two-cycle compression ignition type, the combination of a frame providing a scavenging air supply chamber, a closed series of alternately arranged straight cylinders and crank shafts carried by the frame, opposed pistons in the cylinders and connected to the crank shafts, and means providing for the admission of scavenging air from said chamber to the cylinders.

21. In an internal combustion engine the combination of a polyhedral frame having outwardly extending flanges adjacent to the corners thereof, engine cylinders extending between pairs of said flanges and having their respective ends supported thereby, opposed and alined pistons in the respective cylinders, crank shafts connected to the pistons, and bearings for the crank shafts carried by the frame at corners thereof.

22. In an internal combustion engine, the combination of a plurality of cylinders having intersecting axes, crank shafts disposed adjacent to the cylinder ends, opposed and alined pistons in the respective cylinders and connected to the crank shafts, and a frame for supporting the cylinders and the crank shafts and including tension members formed independently of the cylinders for relieving the latter of axial working forces, said frame including side walls transversely of which are disposed said cylinders and said tension members.

23. In an internal combustion engine, the combination of a plurality of sets of cylinders, each set being so disposed that the axes of the cylinders are coplanar and intersect, crank shafts disposed adjacent to the cylinder ends, opposed pistons in the cylinders connected to the crank shafts, and a frame for supporting the cylinders and the crank shafts and including tension members arranged parallel and alternately with respect to the cylinders and cooperating with the crank shafts to relieve the cylinders of axial working forces.

24. In an internal combustion engine, the combination of a plurality of alternately arranged groups of cylinders and crank shafts disposed in closed series, bearings for the crank shafts, opposed and alined pistons in the respective cylinders and connected to the crank shafts, and means formed independently of the cylinders and connecting the bearings to resist axial working forces and to relieve the cylinders of such forces.

25. In apparatus of the character described, the combination of a box member; crank shafts supported exteriorly of and at parallel corner regions of the box member; and a plurality of expansible chamber defining means carried by the box member, having their axes disposed at right angles with respect to the crank shafts, and arranged in groups located alternately with respect to the crank shafts, each of said means including oppositely movable elements connected to adjacent crank shafts.

26. In apparatus of the character described, the combination of a box member; crank shafts supported at parallel corner regions of the box member; pairs of parallel flange members carried by the box member and alternately arranged with respect to the crank shafts; a plurality of cylinders having their respective terminal portions supported by the flange members; and pistons in the cylinders and connected to the crank shafts.

27. In apparatus of the character described, the combination of a box member; crank shafts supported at parallel corner regions of the box member; a plurality of cylinders carried by the box member, having their axes disposed at right angles with respect to the crank shaft axes, and arranged in groups located alternately with respect to the crank shafts; opposed pistons in the cylinders and connected to the crank shafts; and means formed independently of the box member, disposed thereabout, and cooperating with the crank shafts to resist axial working forces and to relieve the cylinders of such forces.

28. In apparatus of the character described, the combination of a box member providing a scavenge air supply chamber, alternately arranged opposed-piston type cylinders and crank shafts carried by the box member, each of the cylinders being provided with scavenge air inlet openings adapted to communicate with said chamber, and opposed pistons in the cylinders and connected to the crank shafts.

29. In apparatus of the character described, the combination of a girder construction; a plurality of parallel crank shafts carried by the girder construction; a plurality of cylinders carried by the girder construction, having their axes disposed at right angles to the crank shaft axes, and arranged in groups located alternately with respect to the crank shafts; and opposed and alined pistons in the respective cylinders and connected to the crank shafts.

30. In apparatus of the character described, the combination of a frame including longitudinal members having web and flange portions providing channels, cylinders disposed transversely of the channels and having their terminal portions supported by the flange portions, crank shaft bearings carried by the longitudinal members and disposed between adjoining flange portions of adjacent channels, crank shafts carried by the bearings, and pistons in the cylinders and connected to the crank shafts.

31. In apparatus of the character described, the combination of a frame including longitudinal members having web and flange portions providing channels, cylinders disposed transversely of the channels and having their terminal portions supported by the flange portions, crank shaft bearings carried by the longitudinal members and disposed between adjoining flange portions of adjacent channels, crank shafts carried by the bearings, and pistons in the cylinders and connected to the crank shafts, said frame including tension means cooperating with the bearings for resisting axial working forces and for relieving the cylinders of such forces.

32. In apparatus of the character described, the combination of a frame including longitudinal members having web and flange portions providing alternately arranged channel and angle spaces, cylinders disposed transversely of the channel spaces and having their terminal portions supported by the flange portions, crank shaft bearings carried by the frame and disposed in the angle spaces, crank shafts carried by the bearings, and pistons in the cylinders and connected to the crank shafts.

33. In apparatus of the character described, the combination of a frame including longitudinal and end members providing a scavenge air supply chamber and the longitudinal members having web and flange portions providing channels, cylinders disposed transversely of the channels and having their terminal portions supported by the flange portions, crank shafts disposed between adjoining flange portions of adjacent channels and carried by the frame, pistons in the cylinders and connected to the crank shafts, and means for supplying scavenging air from the chamber to the cylinders.

34. In an engine, the combination of a framework consisting of longitudinal members providing channel spaces, cylinders carried by the framework and disposed transversely of the channel spaces, crank shaft bearings carried by the longitudinally-extending members, crank shafts fitting the bearings, pistons in the cylinders, and rods for connecting the pistons to the crank shafts.

35. In an engine, the combination of a frame providing a polygonal arrangement of longitudinal channel spaces, cylinders carried by the frame and disposed transversely of the channel spaces, crank shaft bearings carried by the frame and alternately arranged with respect to the channel spaces, crank shafts fitting the bearings, opposed pistons in the cylinders, and rods for connecting the pistons to the crank shafts.

36. In an engine, the combination of a framework consisting of longitudinal members providing channel spaces, cylinders carried by the framework and disposed transversely of the channel spaces, crank shaft bearings carried by the longitudinally-extending members, crank shafts fitting the bearings, pistons in the cylinders, rods for connecting the pistons to the crank shafts, and tension members extending transversely of the channel spaces and connected to the bearings.

37. In an internal combustion engine, the combination of a base member, a power developing cylinder of the opposed piston type arranged substantially parallel to the base member, bracket means carried by the base member and cooperating with an intermediate portion of the cylinder to resist bodily movement thereof longitudinally, and means provided on the base member and cooperating with terminal portions of the cylinder to resist lateral movement of the latter.

38. In an engine, the combination of a frame construction including substantially parallel flange members, a cylinder disposed between and transversely with respect to the flange members, crank shafts carried by the construction and disposed at the outer sides of the flange members, opposed pistons in the cylinder and connected to the crank shafts, means carried by the frame construction and cooperating with the cylinder to resist bodily movement thereof longitudinally, and means provided on the flange members and cooperating with terminal portions of the cylinder for resisting lateral movement of the latter.

39. The combination, with engine means including cylinders and intervening crank shafts disposed in polygonal formation, of bearings for the crank shafts and tension members formed independently of the cylinders and cooperating directly with the bearings to connect the latter in closed series, whereby axial working forces of the engine means applied to the bearings are resisted by the tension members.

40. In an engine, the combination of a frame providing a scavenging air supply chamber and including a plate member forming a wall for said chamber, a cylinder disposed transversely of the plate member and having scavenging air inlet and exhaust openings, means cooperating with said plate member and providing for the admission of scavenging air from said chamber to the inlet openings, an exhaust manifold communicating with the exhaust openings and arranged at the side of the cylinder opposite to the plate member, crank shaft means carried by the frame, and piston means in the cylinder connected to the crank shaft means.

41. The combination, with engine means including cylinders and intervening crank shafts disposed in polygonal formation, the axes of each polygonal set of cylinders being in a single plane which intersects crank pin portions of the crank shafts and the crank shafts having journal portions disposed laterally of each crank pin portion, bearings for the journal portions, and tension means for connecting the bearings in polygonal sets, whereby axial engine working forces applied to the bearings are resisted by the tension means.

42. In a polyhedral engine, the combination of a plurality of polygonal groups of cylinders, each group having the axes of the cylinders coplanar, corner crank shafts for the groups of cylinders, bearings for supporting the respective crank shafts, and a plurality of groups of tension members for connecting respective bearings of each crank shaft in closed series relationship; said groups of tension members being disposed adjacent to each end of the crank shafts and intermediately of the latter.

43. In a polyhedral engine, the combination of a plurality of polygonal groups of cylinders, each group having the axes of the cylinders coplanar, corner crank shafts having crank pin portions intersected by the planes of the cylinder axes, polygonal sets of crank shaft bearings cooperating with the crank shafts outside of and alternately with respect to the crank pin portions, and tension members arranged outside of and alternately with respect to the cylinders and parallel to the latter for connecting the bearings of the respective sets together in closed series, whereby axial engine working forces are resisted by the bearings and the tension members.

44. In an internal combustion engine, the combination with engine cylinders and intervening crank shafts disposed in polygonal formation, of a frame formed independently of the cylinders for supporting the latter and crank shaft bearings formed independently of the frame and arranged exteriorly of the latter.

45. The combination, with cylinders and intervening crank shafts disposed in polygonal formation, a polyhedral frame formed independently of the cylinders for supporting the latter, and crank shaft bearings formed independently of the frame and connected exteriorly to corner regions of the latter.

46. In power plant apparatus, the combination of a torsionally rigid polyhedral frame having side walls and engine means disposed about and carried by the frame and including sets of parallel cylinders and intervening crank shafts, said sets of cylinders extending transversely of the side walls and the planes of the axes of the sets being substantially parallel relatively to their respective side walls.

47. In power plant apparatus, the combination of a torsionally rigid polyhedral frame having side walls; engine means disposed about and carried by the frame and including sets of parallel cylinders extending transversely of the side walls and the planes of the axes of the sets being substantially parallel relatively to their respective and adjacent side walls; and bearings for the crank shafts formed independently of the frame and connected exteriorly thereto at corner regions thereof.

48. In power plant apparatus, the combination of a torsionally rigid polyhedral frame having side walls; engine means disposed about and carried by the frame and including sets of parallel cylinders extending transversely of the side walls, the planes of the axes of the sets being substantially parallel relative to their respective and adjacent side walls, bearings for the crank shafts formed independently of the frame and connected exteriorly thereto at corner regions thereof and stress means independent of the frame and cooperating with the crank shaft bearings to resist axial engine working forces applied to the latter.

49. In a polyhedral engine, the combination of one or more polygonal groups of cylinders; corner crank shafts; opposed pistons in the cylinders and connected to the crank shafts; and stress constructions disposed parallel with and immediately adjacent to each group and cooperating with the crank shafts to resist axial engine working forces.

50. The combination with internal combustion engine means embodying polygonal groups of cylinders arranged to define a polyhedron, of structural means disposed within the polyhedron and cooperating with different portions of the engine means to resist engine working forces.

51. The combination with internal combustion engine means embodying a plurality of polygonal groups of cylinders arranged to define a polyhedron, each group having the axes of its cylinders co-planar and corner crank shafts for the groups of cylinders, of structural means disposed within the polyhedron and cooperating with oppositely disposed portions of the engine means to resist engine working forces.

52. In an internal combustion engine, the combination of a plurality of polygonal groups of cylinders arranged to define a polyhedron, each group having the axes of its cylinders co-planar, corner crank shafts disposed at the corners of the polyhedron, opposed pistons in the cylinders, rods connecting the pistons to the crank shafts, and structural means disposed within and extending substantially throughout the length of the polyhedron and cooperating with the crank shafts to resist engine working forces.

53. The combination with internal combustion engine means comprising a plurality of polygonal groups of cylinders arranged to define a polyhedron, corner crank shafts disposed at the corners of the polyhedron, opposed pistons in the cylinders, and rods connecting the pistons to the crank shafts, of structural means extending transversely and longitudinally within the polyhedron throughout substantially the length of the polyhedron and cooperating with the engine means to resist torsional displacement of the latter.

54. The combination, with engine means including cylinders and intervening crank shafts disposed in polygonal formation, of supporting means for the engine means including pairs of substantially parallel wall elements for supporting both terminal portions of each cylinder.

55. In apparatus of the character described, the combination of a plurality of pairs of parallel flange or plate members, said flange or plate members each having similarly disposed openings, cylinders arranged transversely between the flange or plate members of the pairs and having their axis disposed coaxially with respect to opposed openings in the pairs of flange or plate members, crank shafts alternately arranged with respect to said pairs of flange or plate members and carried thereby, and pistons in the cylinders and connected to the crank shafts.

56. In an internal combustion engine, the combination of a plurality of alternately-arranged cylinders and crank shafts, means for retaining the cylinders and the crank shafts in the form of a polyhedron, and a reservoir arranged within the polyhedron for storing gaseous media and provided with means for supplying such media to the cylinders.

57. In an internal combustion engine of the opposed piston type, the combination of a plurality of polygonal sets of cylinders arranged side-by-side to form a polyhedron, alternate adjacent end portions of the cylinders having admission openings, a reservoir for storing gaseous media and arranged within the polyhedron, and means for supplying gaseous media from the reservoir to the admission openings.

58. In a polyhedral engine, the combination of a plurality of polygonal sets of cylinders, corner crank shafts connected to opposed pistons in the cylinders, a plurality of polygonal sets of bearings cooperating with the crank shafts, the bearing sets being arranged outside of and alternately with respect to the planes of the axes of the cylinder sets, and stress constructions associated with each of the sets of bearings for binding the bearings of each set together in polygonal formation to resist engine working forces tending to move the bearings of each set apart.

59. In a polyhedral engine, the combination of a plurality of sets of cylinders; the cylinders of each set being arranged in polygonal formation and the sets being disposed in parallel, side-by-side relation so as to define a polyhedron; corner constructions connecting the adjacent ends of the cylinders and provided with crank shaft bearings; crank shafts supported by the bearings and connected to opposed pistons in the cylinders; and stress constructions for maintaining said corner constructions in their polygonal arrangement and including members arranged between the planes of the axes of cylinders of adjacent sets.

60. In a polyhedral engine, the combination of a plurality of sets of cylinders; the cylinders of each set being arranged in polygonal formation and the sets being disposed in parallel, side-by-side relation so as to define a polyhedron; corner constructions connecting the adjacent ends of the cylinders and provided with crank shaft bearings; crank shafts supported by the bearings and connected to opposed pistons in the cylinders; stress constructions for maintaining said corner constructions in their polygonal arrangement and including members arranged outwardly of the planes of the axes of the cylinders of the outside sets and between the planes of the axes of cylinders of adjacent sets; and means cooperating with the corner constructions for resisting torsional displacement of the corner constructions, crank shafts and cylinders.

In testimony whereof, I have hereunto subscribed my name this eighth day of Jan., 1926.

HERBERT T. HERR.